United States Patent [19]

Huang

[11] Patent Number: 4,592,139
[45] Date of Patent: Jun. 3, 1986

[54] DUAL-PURPOSE CUTTER AND CLIPPER FOR SPONGE CAKE

[76] Inventor: Judith Huang, Rm. 2D, 6th Fl., No. 183, Chung-Hsaio E. Rd., Sec. 4, Taipei, Taiwan

[21] Appl. No.: 754,975

[22] Filed: Jul. 15, 1985

[51] Int. Cl.⁴ ............................................. A21C 15/04
[52] U.S. Cl. ........................................................ 30/114
[58] Field of Search ..................... 30/114, 124; 294/3, 294/167

[56] References Cited

U.S. PATENT DOCUMENTS

| | | | |
|---|---|---|---|
| 593,386 | 11/1897 | Williams | 30/114 |
| 2,264,486 | 12/1941 | Smith et al. | 30/114 |
| 2,555,690 | 6/1951 | Guerra | 30/114 |
| 2,571,465 | 10/1951 | McDevitt | 30/114 |
| 2,598,789 | 6/1952 | Harrell | 30/114 |
| 2,600,646 | 6/1952 | Haugland | 30/114 |
| 2,770,035 | 11/1956 | O'Brien | 30/114 |
| 2,841,868 | 7/1958 | O'Brien | 30/114 |
| 3,888,001 | 6/1975 | Gilbart-Smith | 30/114 |
| 4,411,066 | 10/1983 | Allahverdian | 30/114 |

Primary Examiner—Jimmy C. Peters

[57] ABSTRACT

The present invention relates to a dual-purpose cutter and clipper for sponge cake mainly comprising such parts as a first flat body and a second flat body and a plug-in pin, in which a hollow round tube is formed close to the upper and lower sides at one end of the first flat body, and a grip handle is formed at its other end; a hollow round tube is formed close the middle part of one end of the second flat body and a grip handle same as of that on the said first flat body is formed at its other end, further the afore-said hollow round tubes in the first and second flat bodies can just match together in the overlapping upper and lower positions to form a through hollow round tube, a plug-in pin penetrates through the above-said hollow round tubes to make the said two flat bodies become movable with the plug-in pin as their axis and then used to cut and take the sponge cake according to the any preferred angle, further several parallel concave grooves are provided in the inner side faces on each of the said first and second flat bodies to achieve the object of catching up the sponge cake pieces to facilitate the convenient pick-ups of the sponge cake pieces and also to maintain a eye-catching appearance of the sponge cake, thus providing a good sense of feeling to the people, after the sponge cake is cut.

1 Claim, 3 Drawing Figures

DUAL-PURPOSE CUTTER AND CLIPPER FOR SPONGE CAKE

BACKGROUND OF THE INVENTION

The fast developments of the communication means have made the dream of "the distant places just like the nearby neighbors" come true and also the mankind of today have good chances to contact overseas culture and tradition; the food originally belonging to the European and American features—the sponge cake has also one of the integral delicious delicacies in our daily life, the occasions like birthday, celebrations, western dinner parties, etc. display the specific flavors due to the decorations and supplements of sponge cakes, but when we face an intricately made sponge cake, it is a not simple matter concerning how to properly cut and divide the cake for all the people to eat without making the cake in a mess.

The conventional sponge cake cutters often belong to the common knife tools, although it is no difficulty for them to cut the sponge cakes, it is always hard to pick up the cut sponge cakes, because the cakes are soft in quality and greasy with butter and other decorators, if there is no adequate clamps to aid, but the pieces of cut cake are directly picked up, they may become damaged which turns the makers' laborious efforts, consequently how to design a practical sponge cake dual purpose cutter and clipper is a pressing mission!

In view of the fact the conventional sponge cutters can never satisfactorily complete the cake cutting task, the inventor has, in reponse to the drawbacks, carefully conducted a research work and finally developed a simple, practical and easy small bits-removing sponge cake dual-purpose cutter and clipper, thus completely eliminating the troubles and helpfulnesses involved in cutting and picking up the sponge cakes for a long time.

SUMMARY OF THE INVENTION

The main object of the present invention is to provide a sponge cake dual-purpose cutter and clipper in which its two flat bodies in an identical shape are made of a proper material (for instance, stainless steel), of which, a hollow round tube is formed at the place close to the upper and lower sides of one end of one flat body respectively, and a grip handle suitable for holding and use formed at the other end of said flat body, a hollow round tube is formed at the middle part of one end of the other flat body, and an identical grip handle is formed on the other end of the other flat body, additionally, the hollow round tubes on one end of the above-said two flat bodies can just mutually match in the overlapping upper and lower positions to form a through hollow round tube, a plug-in pin penetrate through the above-said hollow round tubes at the same time, thus making the above-said two flat bodies intersect in a proper angle with the plug-in pin as their axis, and the intersected angle between them maybe adjusted if necessary, further the above-said some parallel concave grooves are provided in the inner sides of each of the said two flat bodies to achieve the object of conveniently and correctly cutting and picking up the sponge cakes and also maintaining the outer appearance of the sponge cakes in an eye-ctaching sense of feeling for the people, besides the hollow round tubes and plug-in pin can be removed and mounted thereon at any time to make the cleaning and neatness and cleanness maintainence work become very convenient.

DETAILED DESCRIPTION OF THE PREFERRED EMBODIMENT

Figure 1:
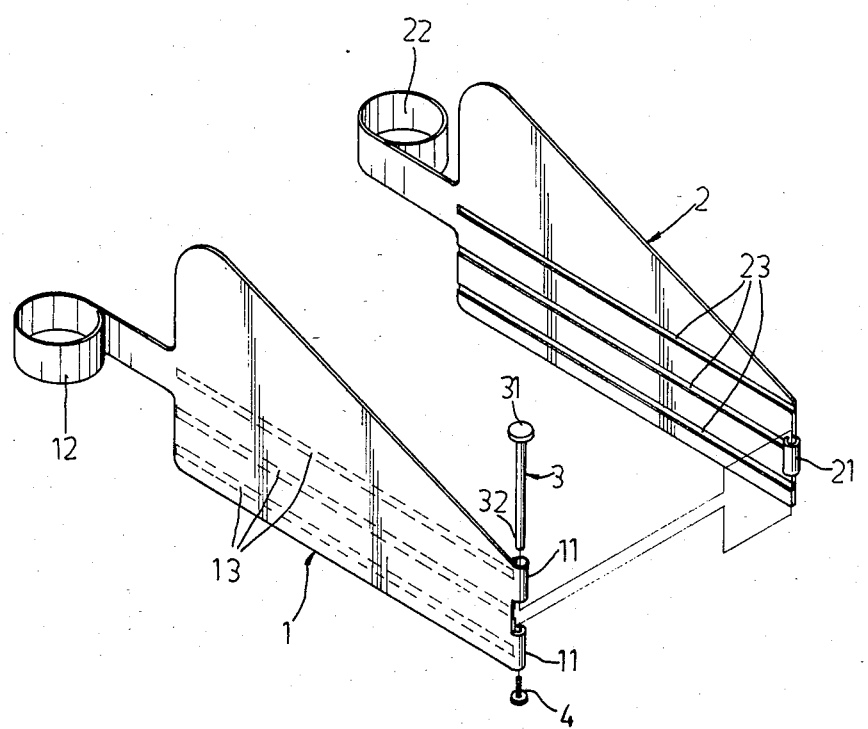
FIG. 1 is the parts exploded view of the invention.
Figure 2:
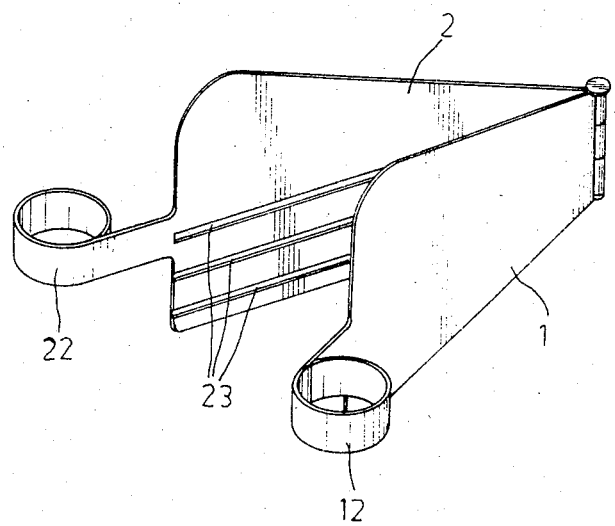
FIG. 2 is the outside view of the invention.

Please refer to FIG. 1, the present invention mainly comprises the first flat body (1), second flat body (2), and plug-in pin (3); a first flat body (1) is made of a proper material (for example, stainless steel) into a proper form of a flat body, the place close to the upper and lower sides of one end of said flat (1) extends properly and also forms a hollow round tube (11), and its other end also extends properly to form a easy holding and using grip handle (12); a second flat body (2) is a flat body with same material and in a same shape as that of the first flat body; the place close to the middle part of its one end extends properly and also forms a hollow round tube (21) and its other end extends properly to form a grip handle (22) identical to that on the first flat body (1); a plug-in pin (3) is a hollow cylinder, a plug-in pin cap (31) is provided on its one end, its other end is an inner threaded end (32); the hollow round tubes (11), (21) in one end of the first and second flat bodies (1), (2) can just match in overlapping upper and lower positions to form a through hollow round tube, after the said plug-in pin (3) is inserted through the said upper and lower through hollow round tubes (11), (21) then the screw (4) is screwed in the inner threaded end (32) of the said plug-in pin (3), thus making the said two flat bodies (1), (2) intersect in a proper angle with the said plug-in pin (3) as their axis (as shown in FIG. 2), and the intersected angle between them maybe adjusted freely, further some parallel concave grooves (13), (23) are provided in the inner side surfaces of the two flat bodies (1), (2) respectively to increase the reliability and stability during clipping and picking up the sponge cakes.

Figure 3:
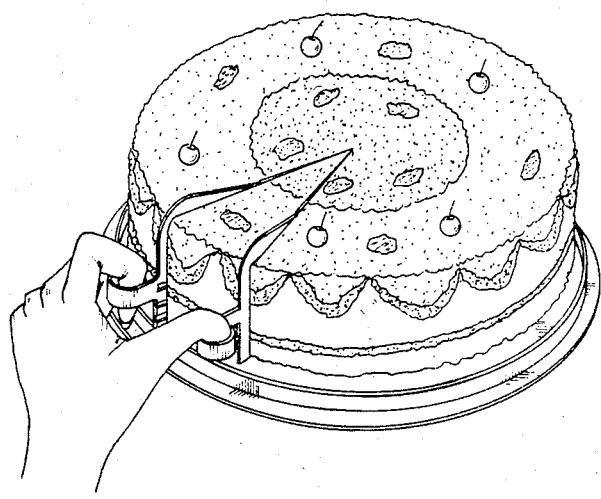
FIG. 3 is the view of preferred embodiment of the invention.

When we desire to cut and pick up the sponge cake, we only need to hold the grip handle (12), (22) parts of the invention by our hand, to adjust the intersected angle between the first and second flat bodies (1), (2), then to appoint the said two flat bodies (1), (2) to the sponge cake and then to cut the cake perpendicularly down, so we may clip and catch may piece of the sponge cake in a desired size by the concave grooves (13), (23) in the inner side surfaces of said flat bodies (1), (2) and easily take it out from other cut sponge cake pieces so as to maintain a pleasant eye-catching feeling of the outer appearance of the sponge cake for us (as shown in FIG. 3), further when we desire to remove the residual small bits of the sponge cake or butter on this cutter and clipper, we only need to unscrew the said screw (4) out from the inner threaded and (32) of the said plug-in pin (3), and to pull the plug-in pin (3) from the upper and lower through hollow round tubes (11), (21), thus making the said two flat bodies (1), (2) separate to achieve the object of conveniently cleaning the cutters and clippers.

Summing all the above up, the present invention has obviously and thoroughly solved the troubles of the conventional sponge cake cutters resulted from and during cutting the sponge cakes, additionally as this has never been disclosed in any publications, fully conforming the utility model patent essential prerequisites, the patent application of the present invention is filed with your authorities according to the laws and regulations concerned.

I claim:

1. A dual-purpose cutter and clipper for sponge cake mainly comprising first flat body, a second flat body and a plug-in pin, in which the first flat body is made of a proper material and in a proper shape, the place close to the upper and lower sides of its one end extends properly and forms a hollow round hole respectively, and its other end extends properly and also forms a convienient holding and using grip handle; the second flat body is a flat body with material and shape identical to those of the said first flat body; the place close to the middle part of its one end extends properly and also forms a hollow round tube, and its other end also extends properly and forms a same grip handle as of that of the said first flat body; a plug-in pin is a hollow cylinder, a plug-in pin cap is provided on its one end, its other end is an inner threaded end; the hollow round tubes provided on one end of the respective said two flat bodies (1), (2) can just mutually match in overlapping upper and lower positions to form a through hollow round tubes, after the said plug-in pin is inserted through the said upper and lower through hollow round tube, then the screw is screwed into the inner threaded end of the said plug-in pin to make the said first and second flat bodies intersect in a proper angle with the said plug-in pin as their axis, and the intersected angle between them can be adjusted freely, further some parallel concave grooves are provided in the inner side surfaces of the said first and second bodies respectively to achieve the object of conveniently, properly, and firmly cutting and clipping the sponge cakes and also maintaining the pleasant eye-catching feeling of the outer appearance of the cakes to the people as the features.

* * * * *